(12) United States Patent
Yu et al.

(10) Patent No.: US 10,177,850 B2
(45) Date of Patent: Jan. 8, 2019

(54) DUAL POLARIZATION VECTOR SIGNAL GENERATION AND DETECTION

(71) Applicant: ZTE Corporation, Shenzhen (CN)

(72) Inventors: Jianjun Yu, Basking Ridge, NJ (US); Xinying Li, Morristown, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/635,077

(22) Filed: Jun. 27, 2017

(65) Prior Publication Data

US 2018/0019818 A1  Jan. 18, 2018

Related U.S. Application Data

(60) Provisional application No. 62/363,813, filed on Jul. 18, 2016.

(51) Int. Cl.
| | | |
|---|---|---|
| *H04B 10/2575* | (2013.01) | |
| *H04B 10/516* | (2013.01) | |
| *H04J 14/06* | (2006.01) | |
| *H04B 7/0413* | (2017.01) | |
| *H04B 7/04* | (2017.01) | |
| *H04B 10/532* | (2013.01) | |

(52) U.S. Cl.
CPC ......... *H04B 10/25753* (2013.01); *H04B 7/04* (2013.01); *H04B 7/0413* (2013.01); *H04B 10/25752* (2013.01); *H04B 10/5161* (2013.01); *H04J 14/06* (2013.01); *H04B 10/5165* (2013.01); *H04B 10/532* (2013.01)

(58) Field of Classification Search
None
See application file for complete search history.

(56) References Cited

U.S. PATENT DOCUMENTS

| | | | | |
|---|---|---|---|---|
| 2010/0104294 A1* | 4/2010 | Chen | ............... | H04B 10/516 398/183 |
| 2012/0294616 A1* | 11/2012 | Sasaki | ............... | H04J 14/0298 14/298 |
| 2014/0363159 A1* | 12/2014 | Chien | ............... | H04B 10/506 398/43 |

OTHER PUBLICATIONS

Lin, C.-T., et al., "Optical direct-detection OFDM signal generation for radio-over-fiber link using frequency doubling scheme with carrier suppression," Optics Express, 16(9):6056-6063, Apr. 2008.

(Continued)

*Primary Examiner* — Li Liu
(74) *Attorney, Agent, or Firm* — Perkins Coie LLP

(57) ABSTRACT

A scheme for generating, transmitting and receiving dual-polarization asymmetric single sideband photonic vector signal at millimeter wave spectral region is described. At a transmitter, information bits to be transmitted are modulated using a vector modulation technique to generate a baseband signal. The baseband signal is converted into its single sideband (SSB) version using a complex frequency source having a first frequency. Two IQ signals are generated using an integrated dual polarization IQ modulator. The I/Q modulator is driven by a laser source at frequency fc. The resulting signal is transmitter over an optical transmission medium and/or a multi-input, multi-output over the air antenna configuration, upconverted by a single-ended photodiode to a desired radio-frequency (RF) carrier frequency.

17 Claims, 22 Drawing Sheets

(56) References Cited

OTHER PUBLICATIONS

Lin, C.-T., et al., "Ultra-High Data-Rate 60 GHz Radio-Over-Fiber Systems Employing Optical Frequency Multiplication and OFDM Formats," Journal of Lightwave Technology, 28(16):2296-2306, Aug. 2010.

* cited by examiner ize beam component and a second polarization beam component, propagating the first polarization beam component and the second polarization beam component to a signal output stage, and transmitting, from the signal output stage, the first polarization beam component and the second polarization beam component at a desired radio frequency over a transmission medium is disclosed.

DUAL POLARIZATION VECTOR SIGNAL GENERATION AND DETECTION

CROSS REFERENCE TO RELATED APPLICATIONS

This patent application claims the benefit of U.S. Provisional Patent Application No. 62/363,813, filed on Jul. 18, 2016. The entire content of the before-mentioned patent application is incorporated by reference as part of the disclosure of this application.

BACKGROUND

The wide-spread adoption of multimedia services, broadband internet, and cloud services, among others, has driven the demand of high transmission capacity of optical systems such as short-reach links, access, and metro networks. Typically, it requires optical transmission systems with high data rates (e.g., up to 1 Tb/s and beyond). One such solution includes the use of radio-over-fiber (RoF) architecture in which a fiber optic network is used to carry wireless signals to long distances, by directly sending the wireless signals through fiber via electro-optical conversion.

SUMMARY

The present document discloses techniques for generation, transmission and reception of vector-modulated, dual-polarized, optical communication signals.

In one example aspect, a signal transmission method is disclosed. The signal transmission method includes operating a first in-phase-quadrature (IQ) modulator for receiving a first sequence of information bits, vector-modulating the first sequence of information bits, thereby creating a first stream of vector-modulated symbols, mixing the first stream of vector-modulated symbols with a lower side band (LSB) carrier having a first frequency to generate a complex vector-modulated LSB signal, generating a first in-phase component signal (I-component signal) by adding an imaginary part of the vector-modulated LSB signal with an imaginary part of an upper side band (USB) carrier having a second frequency, generating a first quadrature component signal (Q-component signal) by adding a real part of the vector-modulated LSB signal with a real part of the upper side band (USB) carrier having the second frequency; operating, simultaneously with the first IQ modulator, a second IQ modulator for receiving a second sequence of information bits, vector-modulating the second sequence of information bits, thereby creating a second stream of vector-modulated symbols, mixing the second stream of vector-modulated symbols with another lower side band (LSB) carrier having the first frequency to generate another complex vector-modulated LSB signal, generating a second I-component signal by adding an imaginary part of the another vector-modulated LSB signal with an imaginary part of another upper side band (USB) carrier having the second frequency, and generating a second Q-component signal by adding a real part of the another vector-modulated LSB signal with a real part of the USB carrier having the second frequency, producing, using an integrated dual-polarization IQ modulator, a dual-polarized, vector-modulated optical signal comprising an upper sideband component and a lower sideband component based on the first I-component signal, the first Q-component signal, the second I-component signal, and the second Q-component signal, splitting the dual-polarized, vector-modulated optical signal into a first polarization beam component and a second polarization beam component, propagating the first polarization beam component and the second polarization beam component to a signal output stage, and transmitting, from the signal output stage, the first polarization beam component and the second polarization beam component at a desired radio frequency over a transmission medium is disclosed.

In another aspect, a signal reception method is disclosed. The method includes receiving, at a signal input stage, a first polarization beam component and a second polarization beam component at a target radio frequency over a transmission medium; wherein each of the first polarization beam component and the second polarization beam component is a single side band vector modulated signal, downconverting the first polarization beam component and the second polarization beam component to a first intermediate signal and a second intermediate signal at an intermediate frequency, performing single sideband demodulation on the first intermediate signal and the second intermediate signal to produce a first vector-modulated signal and a second vector-modulated signal, and recovering information bits from the first vector-modulated signal and the second vector-modulated signal.

In yet another aspect, various apparatus embodiments that implement the above-described methods are disclosed.

These and other aspects, and example implementations and variations are set forth in the drawings, the description and the claims.

DETAILED DESCRIPTION

To meet the increasing demand on high data communication bandwidth, developers are continuously looking for new ways by which to carry a greater number of data bits over existing communication infrastructure. In optical communication, data is transmitted over optical carriers, e.g., glass or plastic optical fibers by modulating using a variety of different techniques. Some techniques implement data modulation in the electrical domain, e.g., by processing electronic signals. Alternatively, or in addition, data modulation can also be achieved in the optical domain.

Introduction

Photonic vector mm-wave signal generation adopting single-sideband (SSB) modulation by an in-phase/quadrature I/Q modulator, in which one unmodulated optical sideband and one modulated optical sideband are used for heterodyne beating, and it can realize relatively long-haul fiber transmission because only one sideband is modulated.

Moreover, a dual-polarization I/Q modulator can simultaneously realize the polarization multiplexing of the aforementioned SSB photonic vector signal. After polarization multiplexing, we can double the transmission capacity. At the receiver side, only one single polarization beam splitter (PBS), without the need of an optical local oscillator (LO) source, can realize the polarization-diversity of the generated polarization multiplexing SSB photonic vector signal, since both X- and Y-polarization have an unmodulated sideband, which will significantly simply the system architecture.

We propose and experimentally demonstrate a novel polarization multiplexing photonic vector signal generation technique based on asymmetrical optical carrier suppression modulation adopting a dual-polarization I/Q modulator.

The dual-polarization I/Q modulator output is one vector-modulated sideband and one unmodulated sideband in both X- and Y-polarizations, which can effectively mitigate the fiber chromatic dispersion (CD) effect and realize relatively long fiber transmission distance. The vector-modulated sideband and the unmodulated sideband have unequal sideband frequencies.

We experimentally demonstrate, based on our proposed scheme, the generation and detection of 35-GHz PDM-QPSK vector mm-wave signal at 2 Gbaud (−10 GHz unmodulated sideband and 25 GHz modulated sideband).

In some embodiments, this patent application discloses the use of one integrated polarization multiplexing IQ modulator to double transmission capacity. In some embodiments, multi-input-multi-output (MIMO) DSP algorithm is used to recover data.

Figure 1:
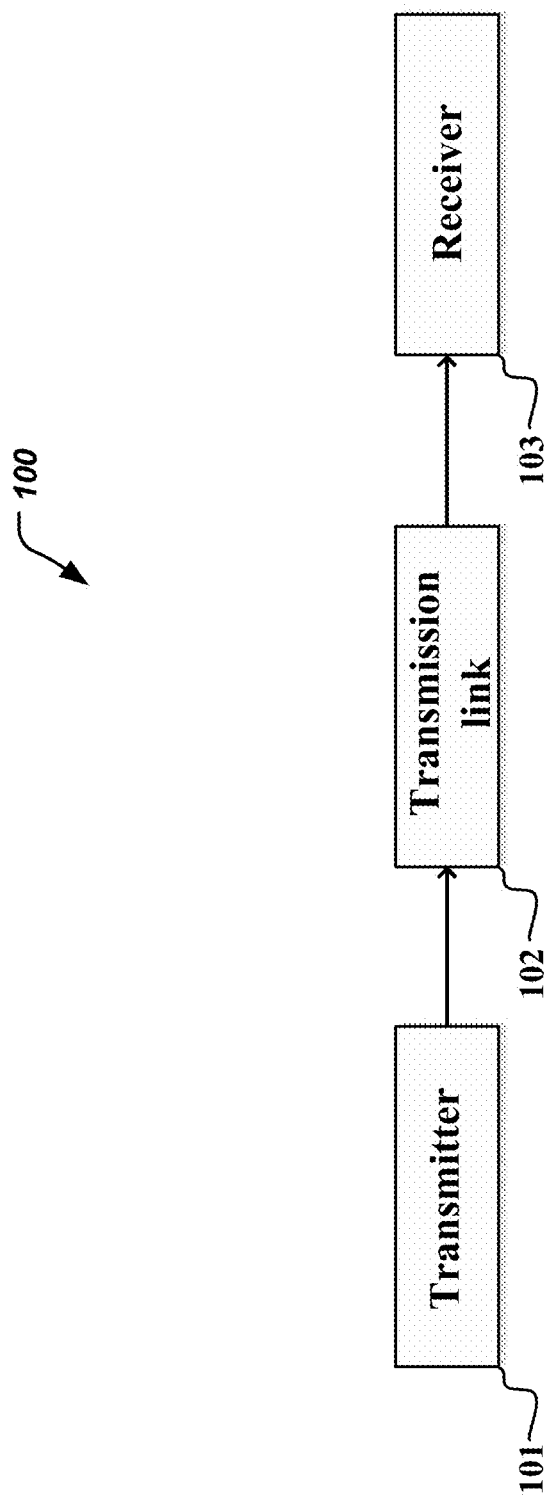
FIG. 1 shows an example block diagram of a system to transmit and receive signals.

FIG. 1 shows an example block diagram of a system 100 to transmit and receive signals. A transmitter 100, e.g., an optical signal transmitter as described herein, may transmit information bits modulated using techniques described herein, over a transmission link 102, directed towards a receiver 103.

Figure 2A:
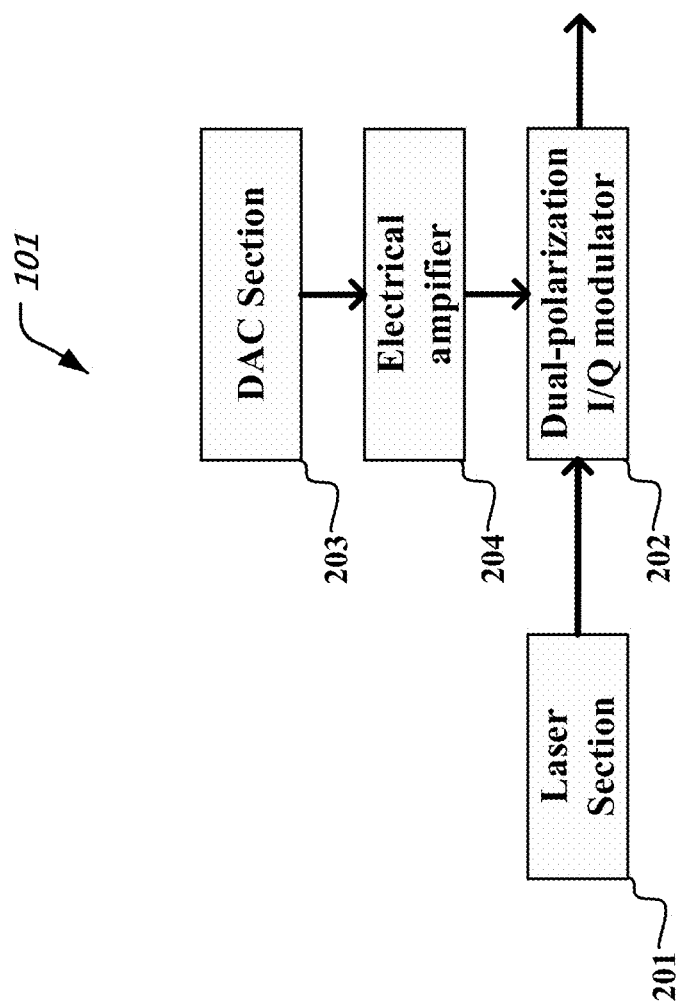
FIG. 2A shows an example embodiment of an optical transmitter.

FIG. 2A shows an example embodiment of an optical transmitter 101. A laser section 201 may be a source of light and provide light input to a dual-polarization I/Q modulator (DPIM) 202. The DPIM 202 may receive signal inputs for modulation via an electrical amplifier 204. The electrical amplifier 204 may in turn be being fed analog baseband IQ signals from a digital to analog (DAC) section 203. The DAC section 203 may receive data such as user/control data, e.g., information bits, and/or test data for simulation and experimentation.

Figure 2B:
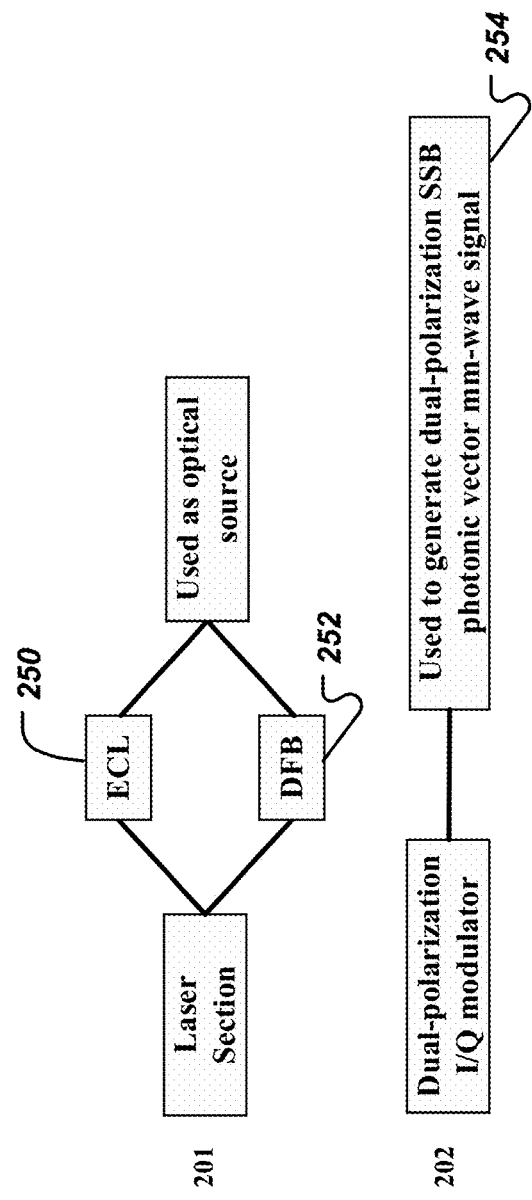
FIG. 2B shows example embodiments of a laser source and an I/Q modulator.

FIG. 2B example embodiments of a laser source and an I/Q modulator. For example, in some embodiments, the laser section 201 may comprise an external cavity diode laser (ECL), shown as box 250. Alternatively, a distributed feedback laser (DFB) embodiment 252 may be used. Other laser source configurations, not specifically shown, may also be possible, as would be appreciated by one of skill in the art. The DPIM 202 may be used to generate a dual-polarization single side band (SSB) photonic vector millimeter wave signal, as indicated by embodiment option 254.

Figure 2C:
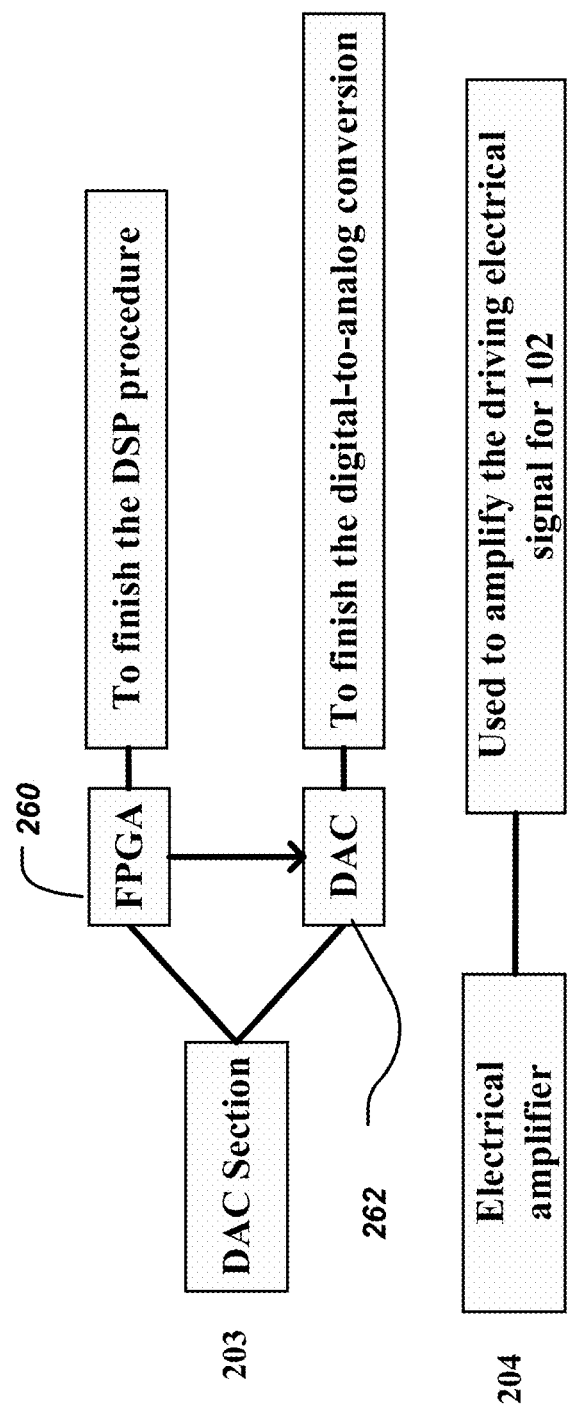
FIG. 2C shows example embodiments of a digital to analog conversion (DAC) section and an electrical amplifier.

FIG. 2C shows example embodiments of a DAC section 203 and an electrical amplifier 204. The DAC section 203 may include a field programmable gate array (FPGA) 260 to perform signal processing and other digital functions, and complementing work performed by a digital signal processor (DSP). These functions are disclosed elsewhere in the present document and may include IQ mapping and digital filtering calculations. The output results of the FPGA 260, along with the DSP output, may be fed into a DAC circuit 262 to generate a signal that is input to the electrical amplifier 204. The electrical amplifier 204 may be optionally present in embodiments, and may be used to adjust output power or voltage or current level of electrical signals.

Figure 3A:
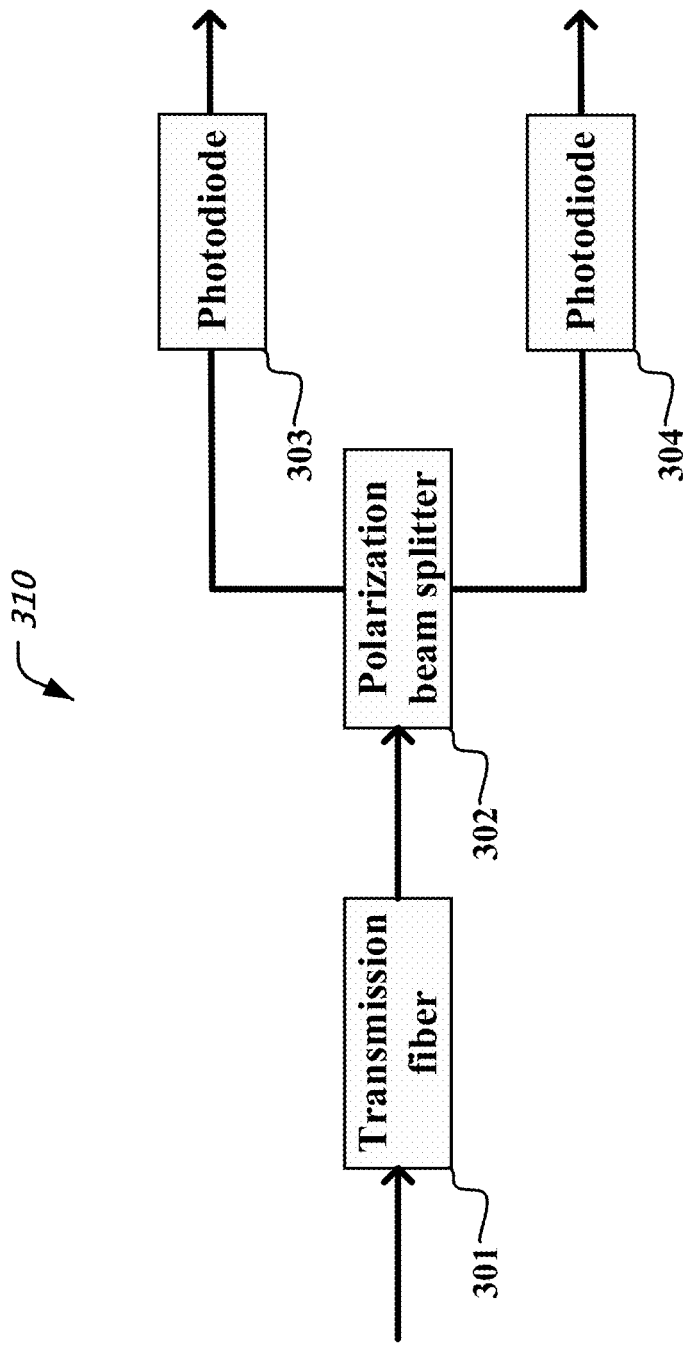
FIG. 3A shows example embodiments of an optical transmission medium.

FIG. 3A shows example embodiments of additional signal processing path 310, e.g., a transmission fiber 301 coupled to, a polarization beam splitter PBS 302 (located on the receiver-side). The PBS 302 may produce multiple outputs, one for each polarization, and feed the output to a corresponding photodiode 303, 304 for further processing. The transmission fiber 301 may carry signal output of the DPIM 202.

Figure 3B:
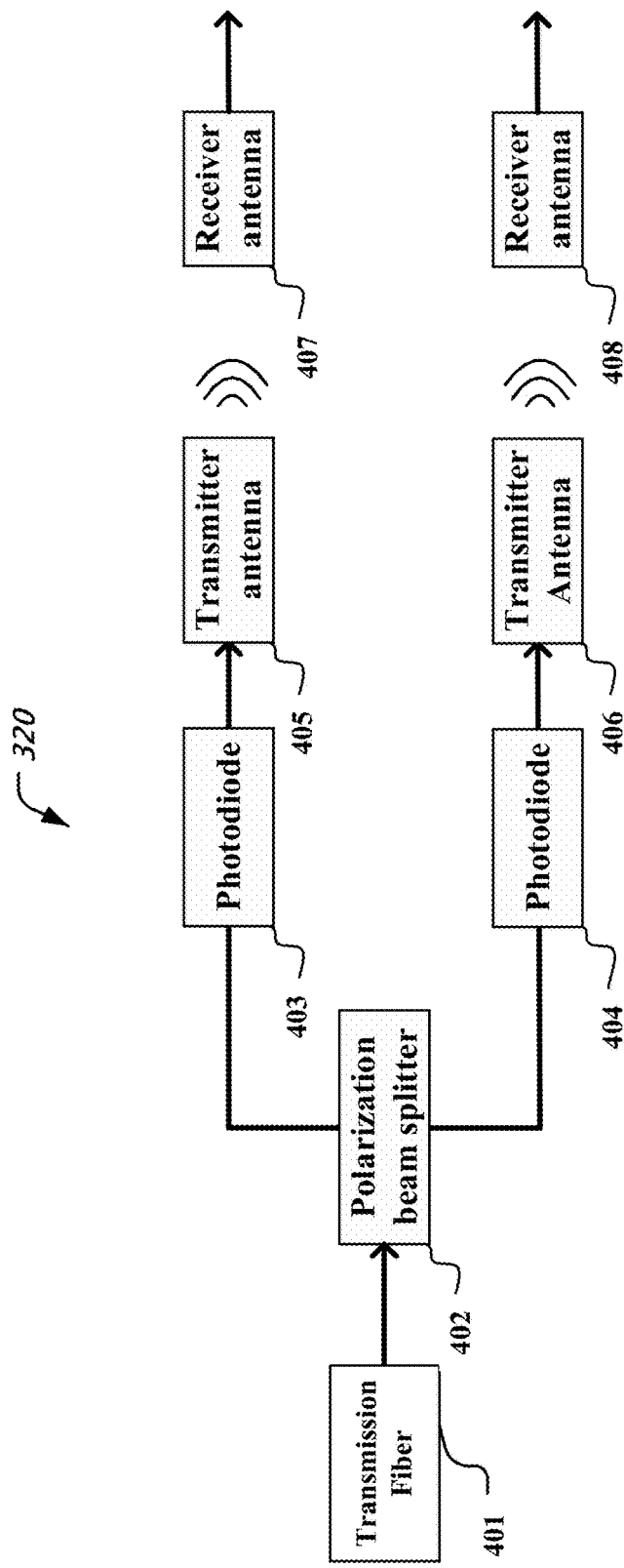
FIGS. 3B-3D show example embodiments of a portion of a transmission system.

FIG. 3B shows an example embodiment of a portion 320 of a transmission system in which downstream transmission is performed only on a wireless transmission signal path. In each polarization path, signal travels through a photodiode (403 or 404), a transmission antenna that performs over-the-air transmission (405, 406) which may transmit the signals to respective receiver antennas 407, 408.

Figure 3C:
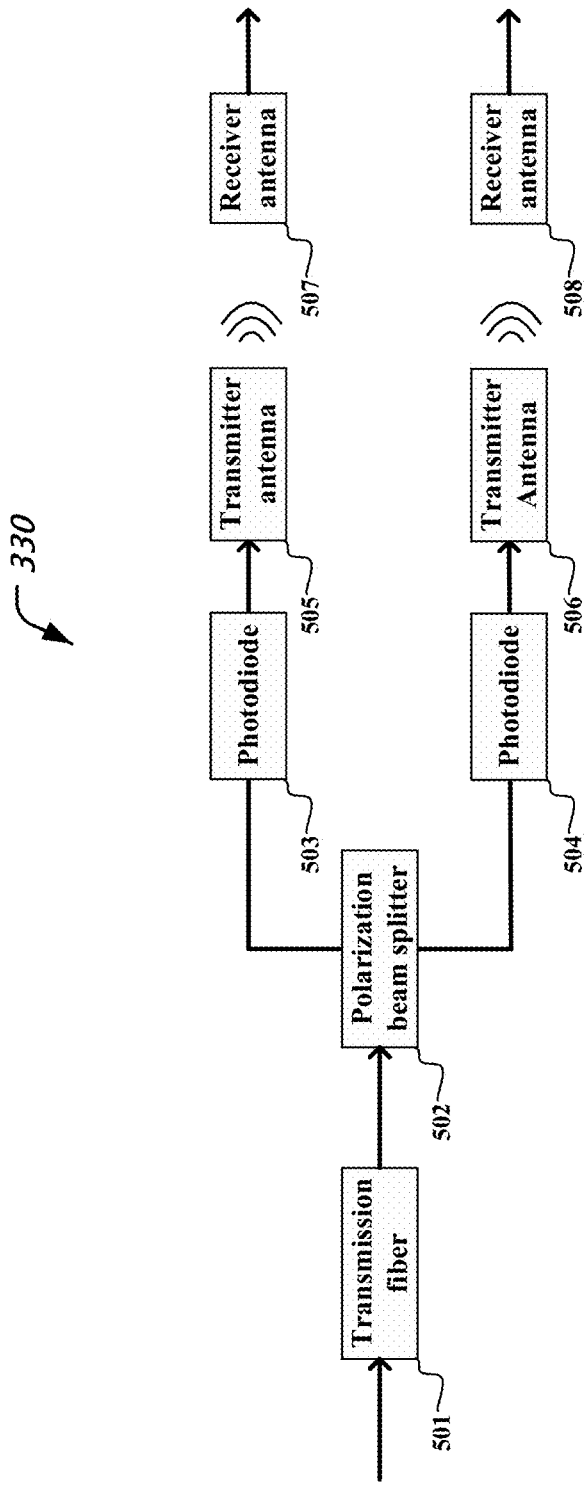

FIG. 3C shows an example embodiment of a portion 330 of a transmission system where signal path includes both fiber and wireless transmission. Transmission signal may first travel through a transmission fiber 501, and then through PBS 502, photodiodes (502, 504), transmission antenna (505, 506) and is transmitted to the corresponding receivers 507, 508.

Figure 3D:
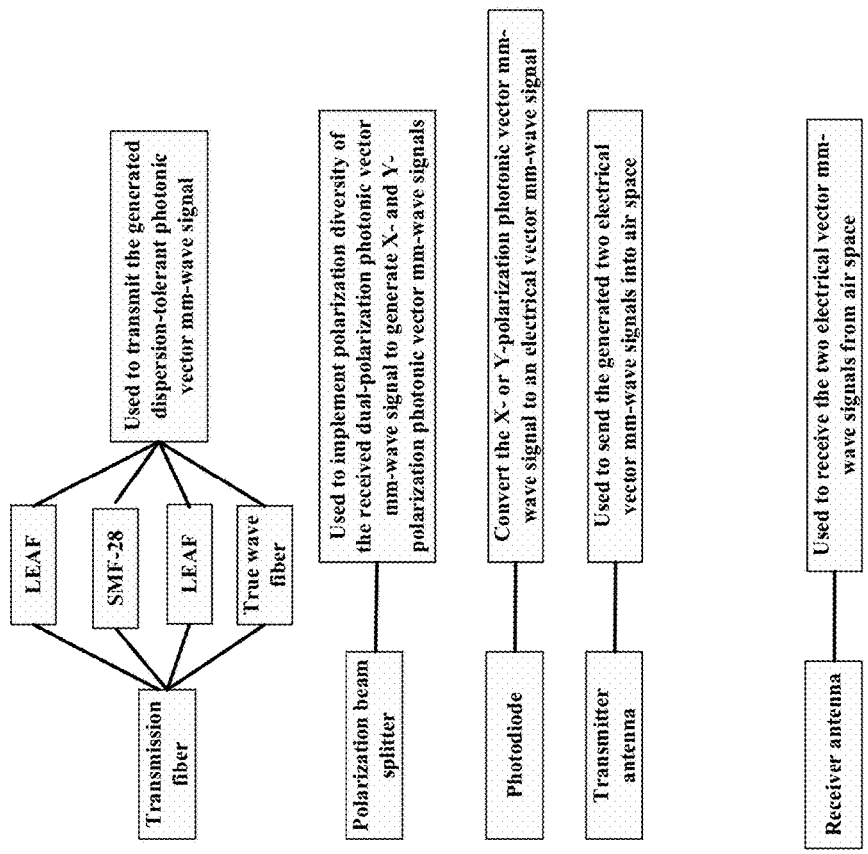

FIG. 3D shows various example embodiment options for the above-discussed modules. The depicted embodiments are not meant to be exhaustive, but provides as examples. For example, in various embodiments, the transmission fibers 301, 401, 501 may be single mode fiber, Truewave fiber, or LEAF fiber by Corning. Any suitable transmission medium that is able to transmit photonic mm-wave signals may in general suffice.

The PBS may be used to implement polarization diversity of the received dual polarization photonic vector mm-wave digital signal to generate X and Y polarization photonic vector signals.

The photodiodes 303, 304, 403, 404 may be used to convert the X or Y polarization signals into electrical domain mm-wave signals (in the GHz range). The transmission antenna may be used to send the generated electrical mm-wave signals into air. The transmission antenna may operate in a multi-input-multi-output (MIMO) configuration, as described herein. The receive antenna may be any suitable receive antenna for receiving mm-wave (GHz range) electrical over-the-air transmissions.

Figure 4:
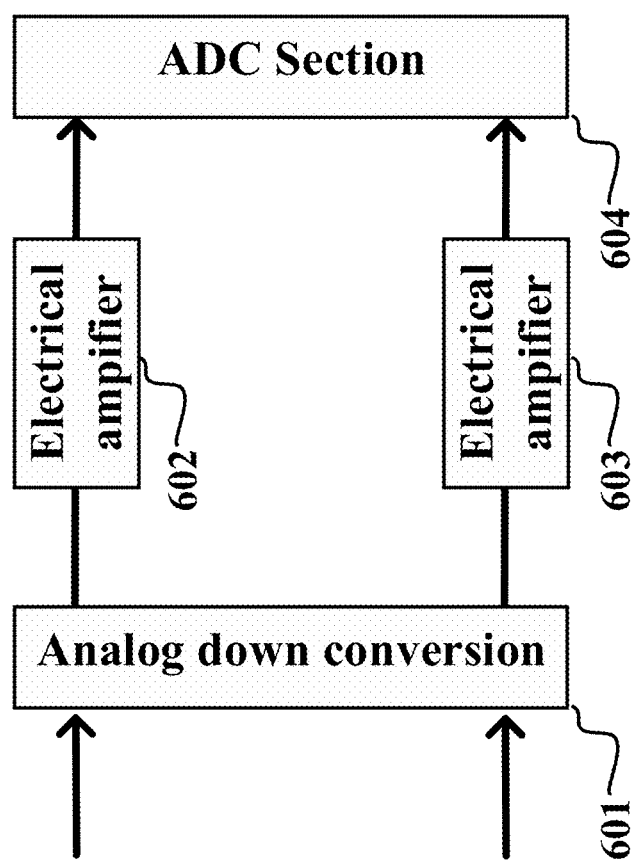
FIG. 4 shows an example embodiment of an analog to digital conversion (ADC) section.

FIG. 4 shows an example embodiment of an analog to digital conversion (ADC) section in the receiver 103. The received signal(s) may be downconverted from mm-wave frequencies using an analog downconversion module 601, electrically amplified using amplifiers 602, 603 (one for each polarization path) and then converted into digital domain using an ADC circuit 604.

Figure 5:
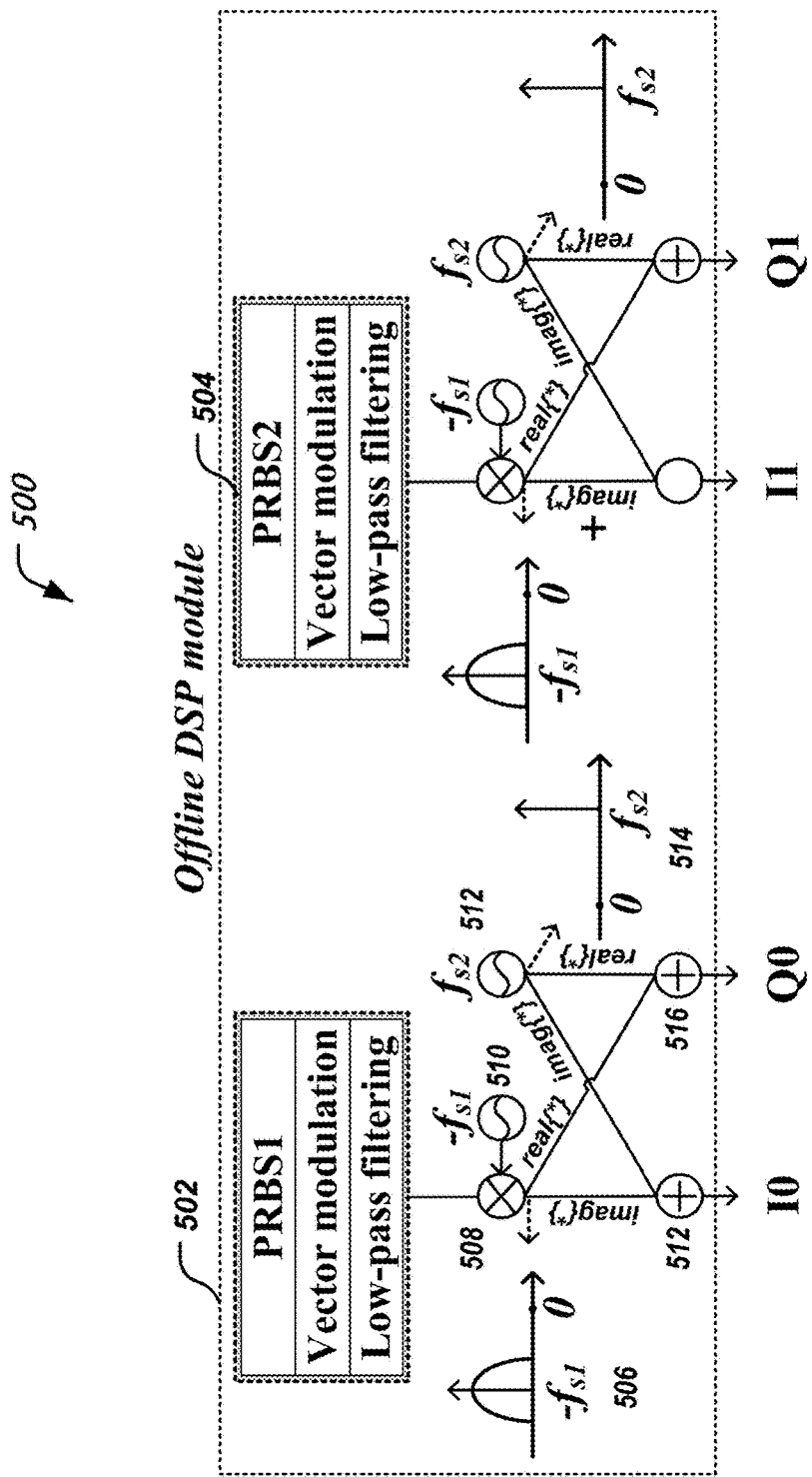
FIG. 5 shows an example embodiment of signal processing performed in a digital signal processing (DSP) module.

FIG. 5 shows an example embodiment of signal processing performed in a digital signal processing (DSP) module 500. In experimental system, an "offline" DSP module may be used to generate a digital data sequence that is known a priori for experimentation and simulation purposes. In operational systems, the DSP may process incoming information bits such as digital data carried over a communication network. When offline data is generated, e.g., for simulation and testing, a pseudorandom binary sequence (PRBS) module may be used to generate random data. The data (PRBS or information bits) may be vector modulated using one of many well-known vector modulation schemes (QPSK and QAM schema of various constellation sizes) and the resulting signal may be lowpass filtered to ensure spectral compactness and provide a desired spectral shape to the resulting signal. In some embodiments, the information bits are transmitted over the transmission medium without precoding the information bits.

The resulting lowpass filtered signal may be translated to an SSB frequency −fs1 using a carrier fs1, and a module such as a multiplier 508 that performs the frequency translation. An example of spectrum of the resulting signal is shown in inset 506. A second frequency carrier 516 at having frequency fs2 is used to generate a second carrier. The real parts of fs1 and fs2 are added together in an adder 516 to generate the first quadrature component Q0 and the imaginary parts of fs1 and fs2 are added together in an adder 510 to generate the I0 component.

Example spectra of the resulting I and Q can be seen from the inset spectrum plots 506 and 514. The second module 504 can be similarly operated to generate the second set of I and Q samples—called I1 and Q1.

While fs1 and fs2 could have same values, leading to a symmetric system, in some embodiments, the frequencies fs1 and fs2 may be selected to be significantly different (asymmetric) from each other. For example, in a symmetrical configuration, both fs1 and fs2 may be 10 GHz or 40 GHz, while in an asymmetric configuration, fs1 may be 40 GHz and fs2 may be 10 GHz or vice versa. One advantage of having asymmetric configuration is to allow different bandwidth of data being modulated on to the asymmetric carriers to achieve high throughput. The absolute values of fs1 and fs2 may be used to position the actual data signals in the spectrum and also perform signal processing to effectively control the shape of the resulting spectrum, while not having to pay excessive penalty of having to use high precision equipment to implement sharp filtering, or high fidelity transmission equipment. To achieve significant spectral diversity or disparity, in some embodiments, one of the carriers may have more than twice the frequency of the other, e.g., fs2 may be greater than 2*fs1.

Figure 6A:
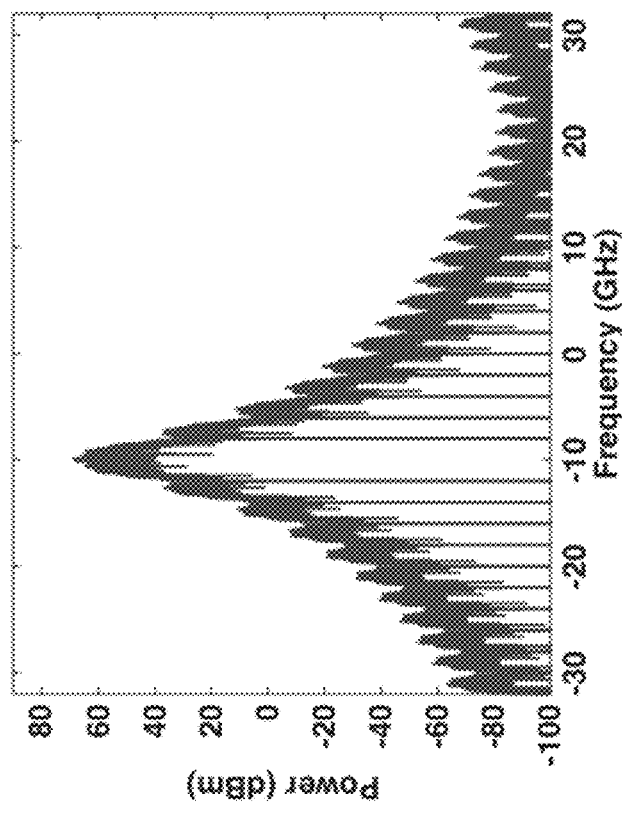
FIGS. 6A-6C show example spectra of various signals used in some embodiments.
Figure 6B:
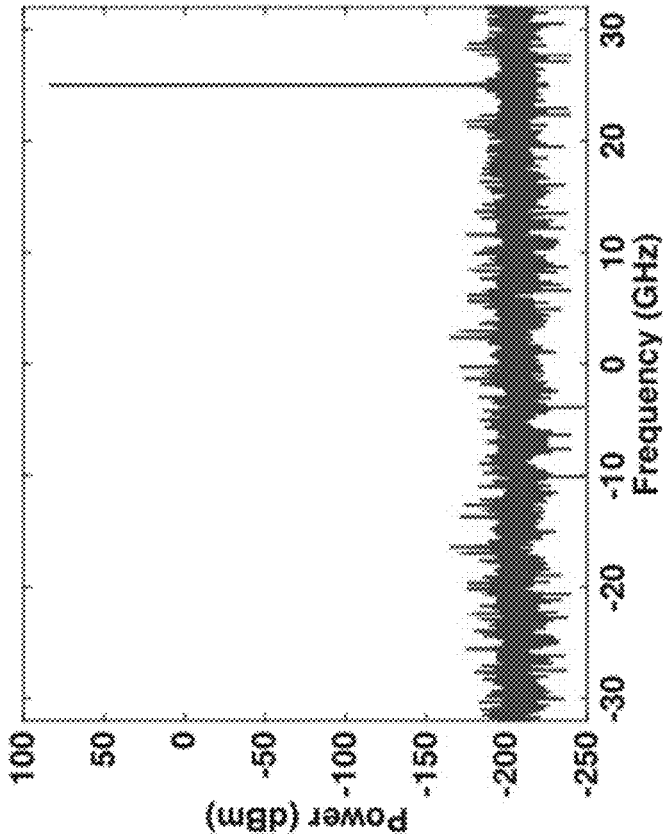
Figure 6C:
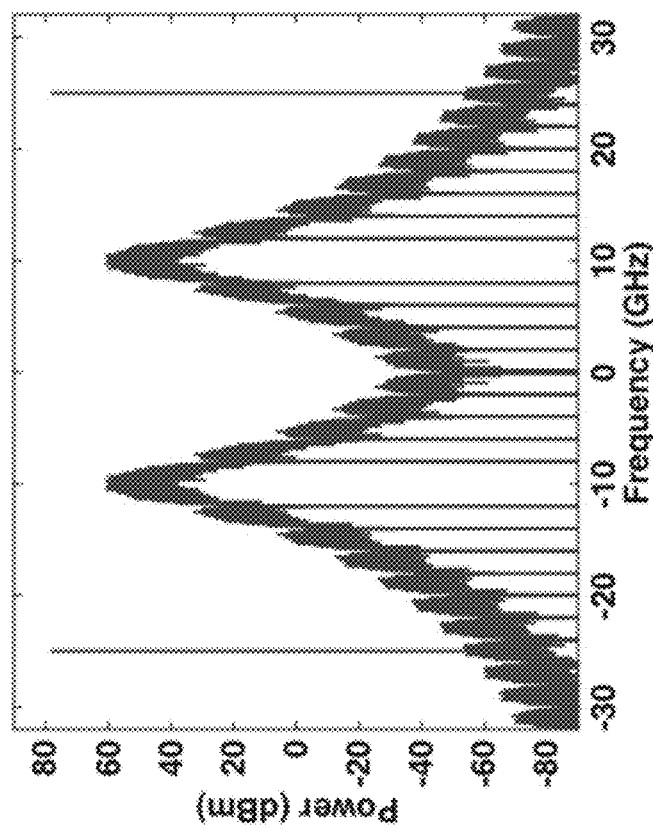

FIGS. 6A-6C show example spectra of various signals used in some embodiments. In particular, FIG. 6A shows an example spectrum used at the lower sideband, with fs1=10 GHz. FIG. 6B shows an example spectrum of fs2, or upper side band, with fs2=25 GHz. In this particular example, QPSK vector modulation is used. FIG. 6C shows the corresponding combined IQ signal spectrum.

Figure 7A:
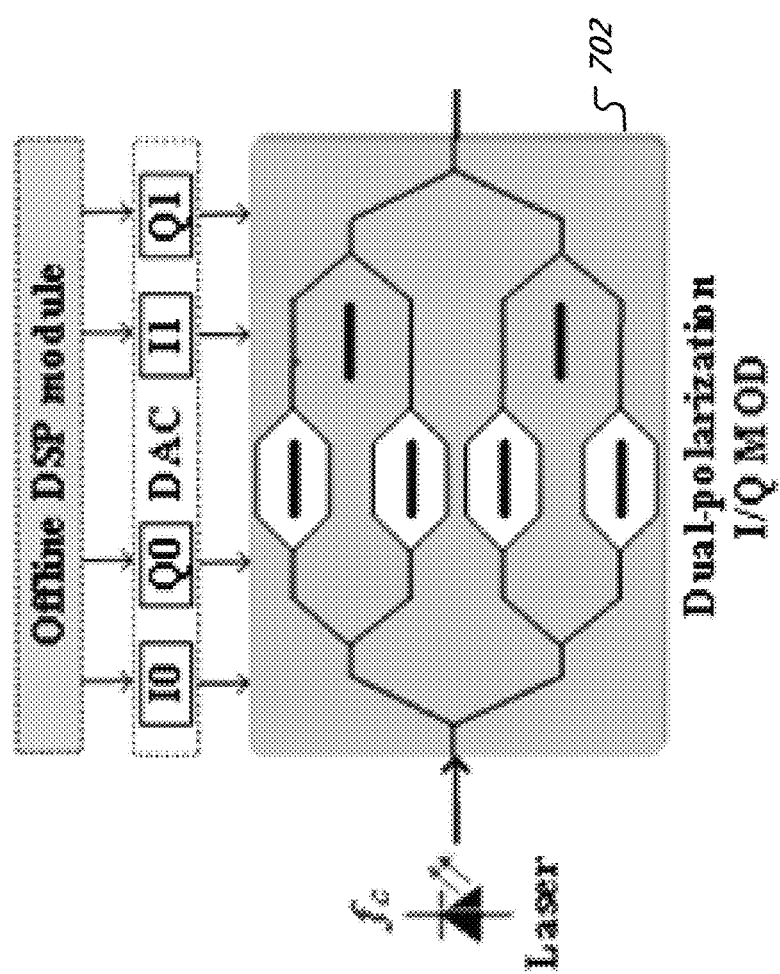
FIG. 7A shows an example embodiment of a transmitter-side subsystem.

FIG. 7A shows an example embodiment of a transmitter-side subsystem similar to the above-described dual-polarized IQ modulator techniques. For each polarization (X and Y), spectra may be generated using the upper and lower sideband techniques disclosed above with respect to FIGS. 5, 6A, 6B and 6C. The dual polarized IQ modulator 702 may be a single integrated unit. Advantageously, such units may avoid mismatch of spectra resulting in each polarization path because the ambient environment for the integrated unit could be controlled to be the same, and thus differential between ambient noise, temperature, vibrations, etc. may not produce significant imbalance in the generated signals.

Figure 7B:
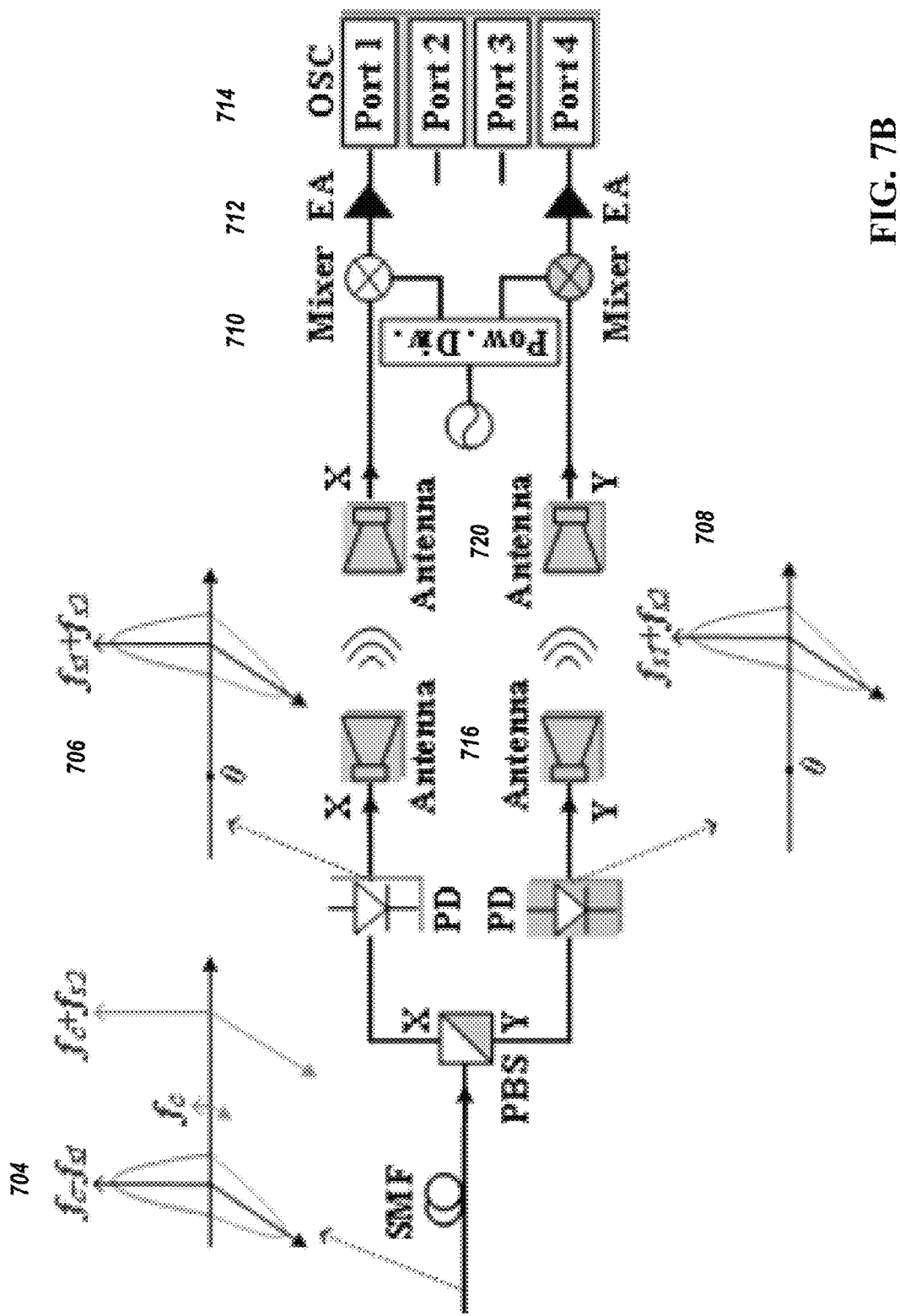
FIG. 7B shows an example embodiment of a transmission-reception system.

FIG. 7B shows an example embodiment of a transmission-reception system. From left of the figure, spectrum the dual-polarized signal output of 702 may look like spectrum 704, which shows the asymmetric dual polarized spectrum with modulated data at the lower subcarrier Fc−fs1 and a carrier at fc+fs2. The dual polarized vector-modulated signal may be transferred through a transmission medium such as a single mode fiber and input to a polarization beam splitter that, upconverts to the frequency fs1+fs2 and splits the X and Y polarization components into two beams. Spectrum 706 shows the first beam has been upconverted to electrical domain frequency fs1+fs2 and the second beam is similarly upconverted to fs1+fs2 frequency. The two polarization beam components are input to a signal output stage 716 which may include an over-the-air MIMO antenna configuration from which the signals may be transferred over the air to a destination receiver antenna.

At the receiver, a signal input stage 720 may comprise MIMO antennas that receive the signal. Further receiver-side signal processing may be performed using a mixer 710 that downconverts the received signal to intermediate signals, optional electrical amplifier 712 for adjusting signal levels and a single side band demodulation stage (not explicitly shown). For proof of concept and experimentation, a digital oscilloscope with multiple ports 714 may be used to generate the various signal plots described with respect to FIG. 8.

Figure 8:
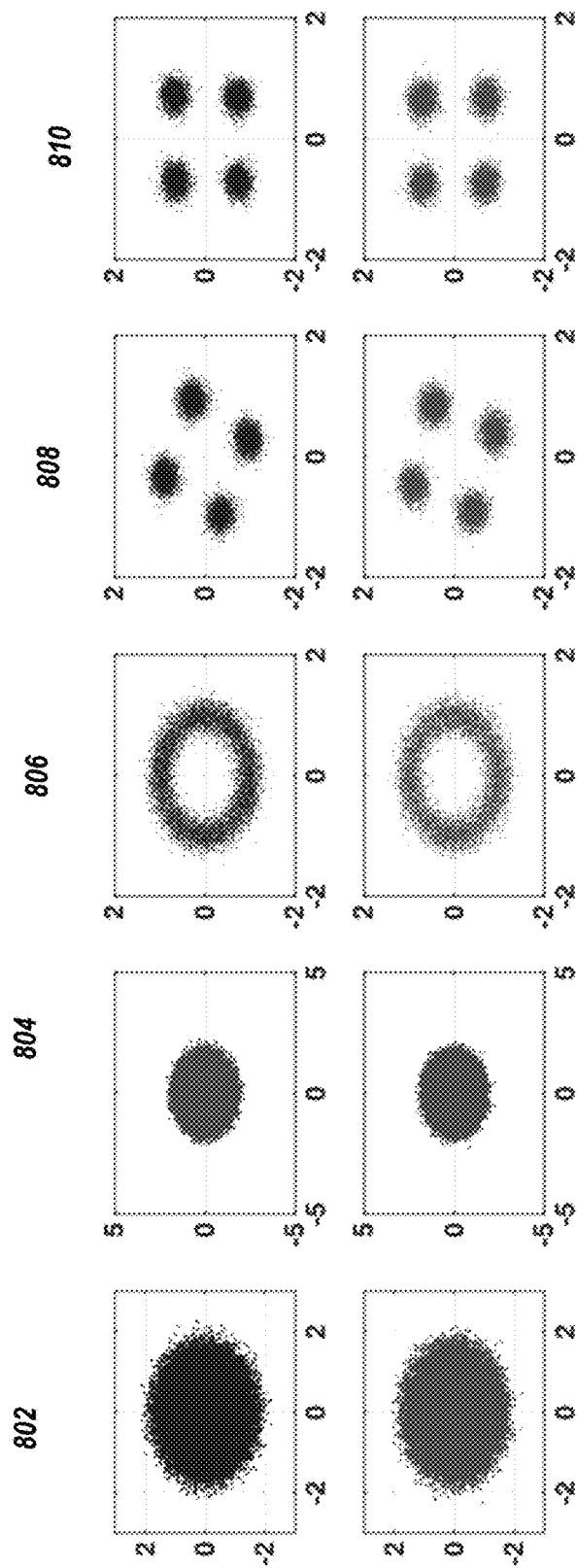
FIG. 8 shows signal constellations according to some embodiments.

FIG. 8 shows various signals received in symbol space in an experimental run of a receiver system for the received X and Y polarization components (802) (X component is on the top and Y component is on the bottom). The received RF signal spectrum is shown in graph 804. Recovered QPSK constellation is shown in graph 806, with symbol decisions and recovered I and Q symbols shown in graphs 808 and 810 respectively. The input power to each photodiode was 2.6 dBm, a bit error rate of zero was observed in the experiment. A constant modulus algorithm (CMA) implementation, with 9-tap butterfly filter, was used for separating X and Y polarization components from each other.

Figure 9:
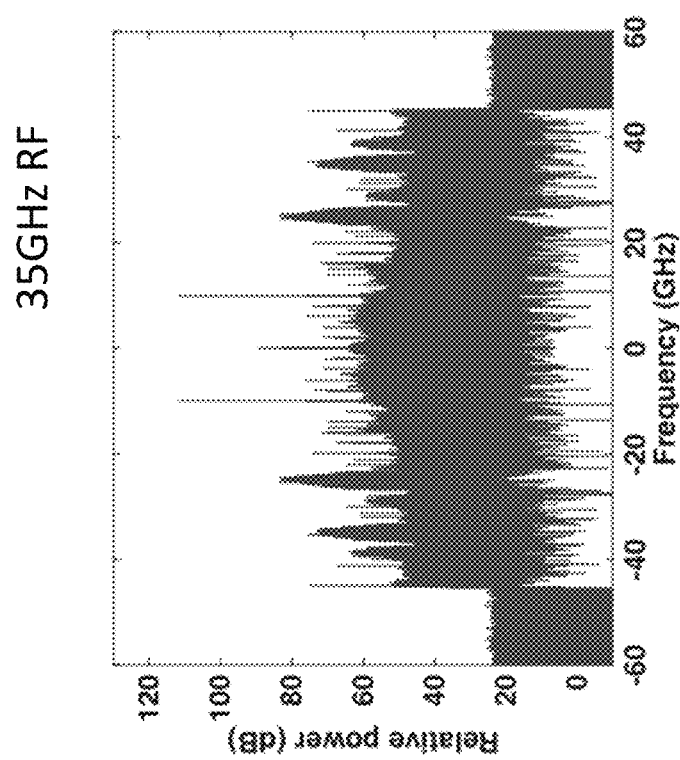
FIG. 9 shows spectrum of a 35 GHz RF signal.

FIG. 9 shows spectrum of a 35 GHz RF signal that was received at the experimental receiver. As can be seen, 20 dB or better attenuation is achieved out-of-band, thereby indicating superlative performance of the disclosed scheme.

Figure 10:
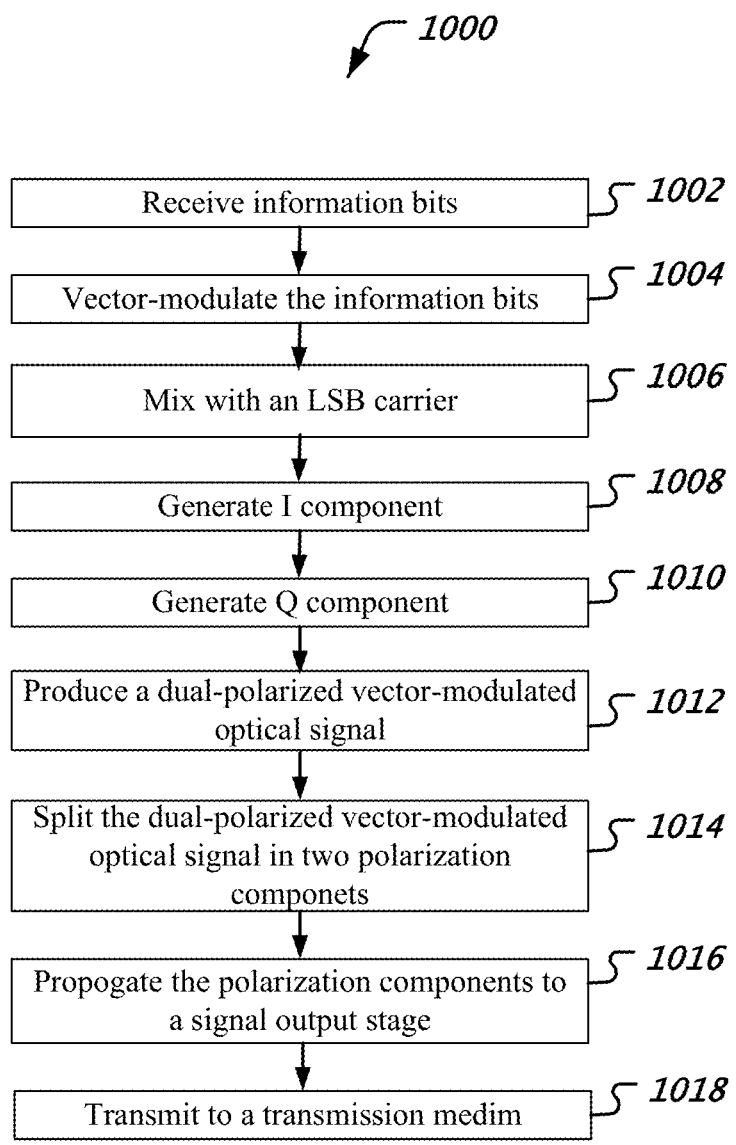
FIG. 10 shows an example flowchart for a method of optical signal transmission.

FIG. 10 shows an example flowchart for a method 1000 of optical signal transmission. The method 1000 may include the following operations, e.g., as described with respect to FIG. 5, FIG. 7A, and FIG. 7B.

A receiving operation 1002 where information bits are received by a first IQ modulator and a second IQ modulator. In some embodiments, the IQ modulators may be implemented in a digital signal processing software and may receive the information bits at a digital input interface of the DSP. Alternatively or additionally, the information bits may be generated by software processes and user interaction directly with the DSP.

A vector-modulation operation 1004 where information bits are vector modulated into symbols of modulated data. In some embodiments, the operation 1004 may be as described with respect to FIG. 5.

A mixing operation 1006 by which the stream of vector-modulated symbols is mixed with a LSB carrier to generate a complex vector-modulated LSB signal. In some embodiments, the operation 1004 may be as described with respect to FIG. 5.

An I component generation operation 1008 in which I-component is generated by adding an imaginary part of the vector-modulated LSB signal with an imaginary part of an upper side band (USB) carrier having a second frequency.

A Q component generation operation 1010 in which a Q-component is generated by adding a real part of the vector-modulated LSB signal with a real part of the upper side band (USB) carrier having the second frequency.

A dual-polarization signal generation operation 1012 in which an integrated dual-polarization IQ modulator is used to produce a dual-polarized, vector-modulated optical signal comprising an upper sideband and a lower sideband signal. In one advantageous aspect, by performing the dual-polarization signal generation in a single, integrated unit, potential imbalance in operation due to temperature drifts or clock drifts can be avoided such that the bit-wise accuracy of alignment of the two IQ streams may be easily maintained.

A signal splitting operation 1014 in which the dual-polarized, vector-modulated optical signal is split into a first polarization beam component and a second polarization beam component. The signal splitting may be achieved using a commercially available polarization beam splitter.

A propagation operation 1016 by which the first polarization beam component and the second polarization beam component are propagated to a signal output stage.

A signal transmission operation 1018 that transmits, from the signal output stage, the first polarization beam component and the second polarization beam component at a desired radio frequency over a transmission medium.

Figure 11:
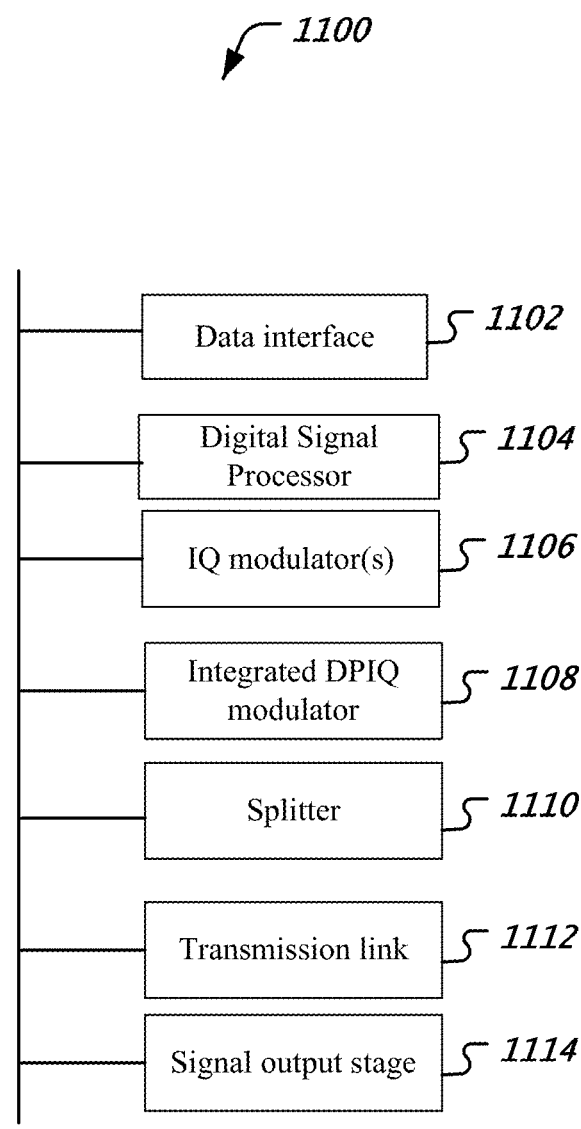
FIG. 11 shows a block diagram for an example optical transmission apparatus.

FIG. 11 shows a block diagram for an example optical transmission apparatus 1100.

The apparatus 1100 includes a data interface 1102 at which information bits or data to be transmitted may be received. The data interface may be, for example, a software application programmers interface (API) running internally to a processor, or may be a well-known bus for receiving external data, such as a Gigabit Ethernet connection.

The apparatus 1104 includes a digital signal processor which may be used to perform some of the signal processing operations described herein.

The apparatus 1100 includes a first IQ modulator (1106) that receives a first sequence of information bits, vector-modulates the first sequence of information bits, thereby creating a first stream of vector-modulated symbols, mixes the first stream of vector-modulated symbols with a lower side band (LSB) carrier having a first frequency to generate a complex vector-modulated LSB signal, generates a first I-component signal by adding an imaginary part of the vector-modulated LSB signal with an imaginary part of an upper side band (USB) carrier having a second frequency, and generates a first Q-component signal by adding a real part of the vector-modulated LSB signal with a real part of the upper side band (USB) carrier having the second frequency.

The apparatus 1100 may include a second IQ modulator that operates simultaneously with the first IQ modulator and receives a second sequence of information bits, vector-modulates the second sequence of information bits, thereby creating a second stream of vector-modulated symbols, mixes the second stream of vector-modulated symbols with another lower side band (LSB) carrier having the first frequency to generate another complex vector-modulated LSB signal, generate a second I-component signal by adding an imaginary part of the another vector-modulated LSB signal with an imaginary part of another upper side band (USB) carrier having the second frequency, and generates a second Q-component signal by adding a real part of the another vector-modulated LSB signal with a real part of the USB carrier having the second frequency.

The apparatus 1100 may include an integrated dual-polarization IQ modulator 1108 that produces a dual-polarized, vector-modulated optical signal comprising an upper sideband signal and a lower sideband signal. For example, FIG. 5 and FIG. 7A show example of the upper sideband and lower sideband signals—data may be modulated on one or both of them.

The apparatus 1100 may include a splitter 1100 that splits the dual-polarized, vector-modulated optical signal into a first polarization beam component and a second polarization beam component. A suitable commercially available polarization beam splitter may be used.

The apparatus 1100 may include a transmission 1112 link that causes the first polarization beam component and the second polarization beam component to propagate to a signal output stage 1114. The transmission link may include any of several well-known optical transmission products such as a single mode fiber.

The signal output stage 1114 may transmit the first polarization beam component and the second polarization beam component at a desired radio frequency over a transmission medium. In some embodiments, the signal output stage 1114 may include a MIMO antenna configuration, e.g., 2×2 antennas.

Figure 12:
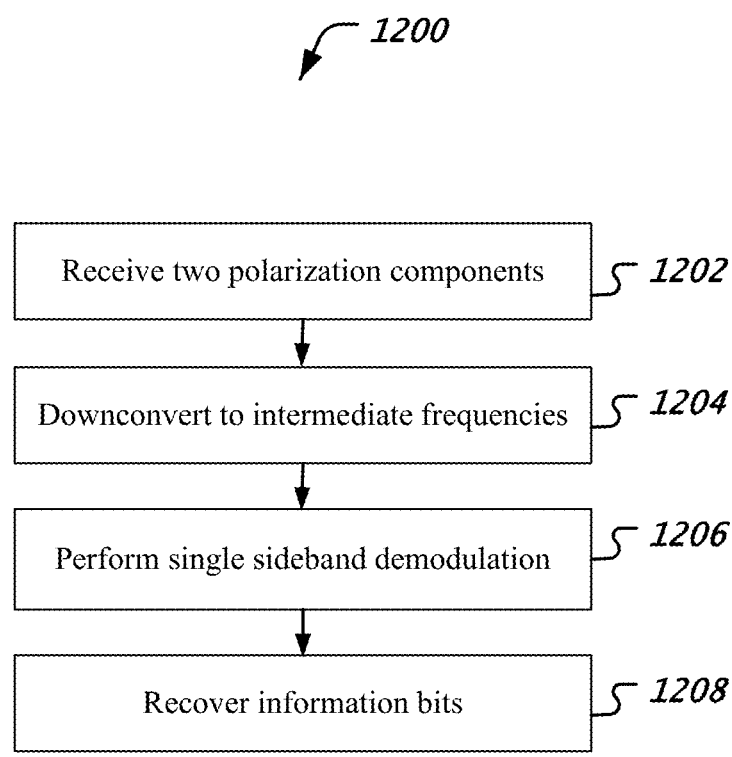
FIG. 12 shows an example flowchart for a method of optical signal reception.

FIG. 12 is a flowchart depiction of an example method 1200 of receiving signals transmitted at least partly through an optical transmission medium.

The method 1200 includes a receiving operation 1202 that receives, at a signal input stage, a first polarization beam component and a second polarization beam component at a target radio frequency over a transmission medium; wherein each of the first polarization beam component and the second polarization beam component is a single side band vector modulated signal;

The method 1200 includes a downconverting operation 1204 that downconverts the first polarization beam component and the second polarization beam component to a first intermediate signal and a second intermediate signal at an intermediate frequency;

The method 1200 includes an SSB demodulation operation 1206 that performs single sideband demodulation on the first intermediate signal and the second intermediate signal to produce a first vector-modulated signal and a second vector-modulated signal; and The method 1200 includes a recovering operation 1208 that recovers information bits from the first vector-modulated signal and the second vector-modulated signal.

Figure 13:
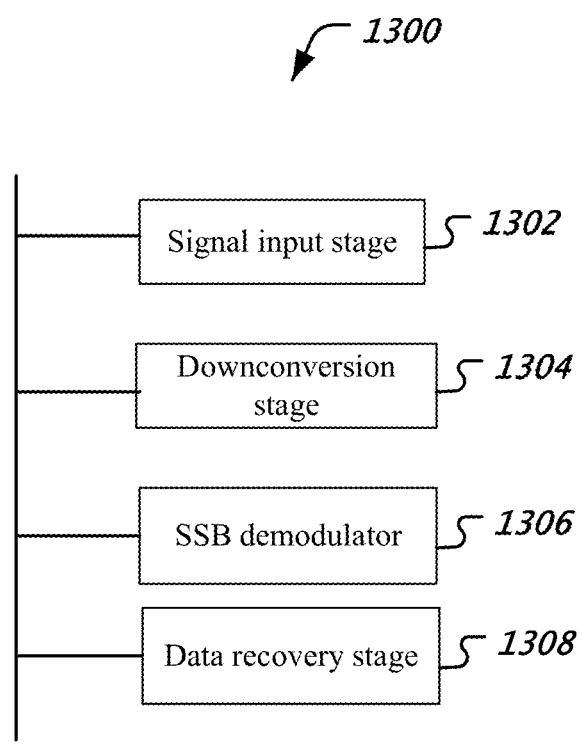
FIG. 13 shows a block diagram for an example optical receiver apparatus.

FIG. 13 is a block diagram representation of an optical receiver apparatus 1300 that receives signals that have gone at least partly through an optical transmission medium.

The receiver apparatus 1300 includes a signal input stage 1302 that receives a first polarization beam component and a second polarization beam component at a target radio frequency over a transmission medium; wherein each of the first polarization beam component and the second polarization beam component is a single side band vector modulated signal;

The receiver apparatus 1300 includes a downconversion stage 1304 that downconverts the first polarization beam component and the second polarization beam component to a first intermediate signal and a second intermediate signal at an intermediate frequency;

The receiver apparatus 1300 includes a single sideband demodulator 1306 that performs single sideband demodulation on the first intermediate signal and the second intermediate signal to produce a first vector-modulated signal and a second vector-modulated signal; and The receiver apparatus 1300 includes a data recovery stage 1308 that recovers information bits from the first vector-modulated signal and the second vector-modulated signal.

Figure 14:
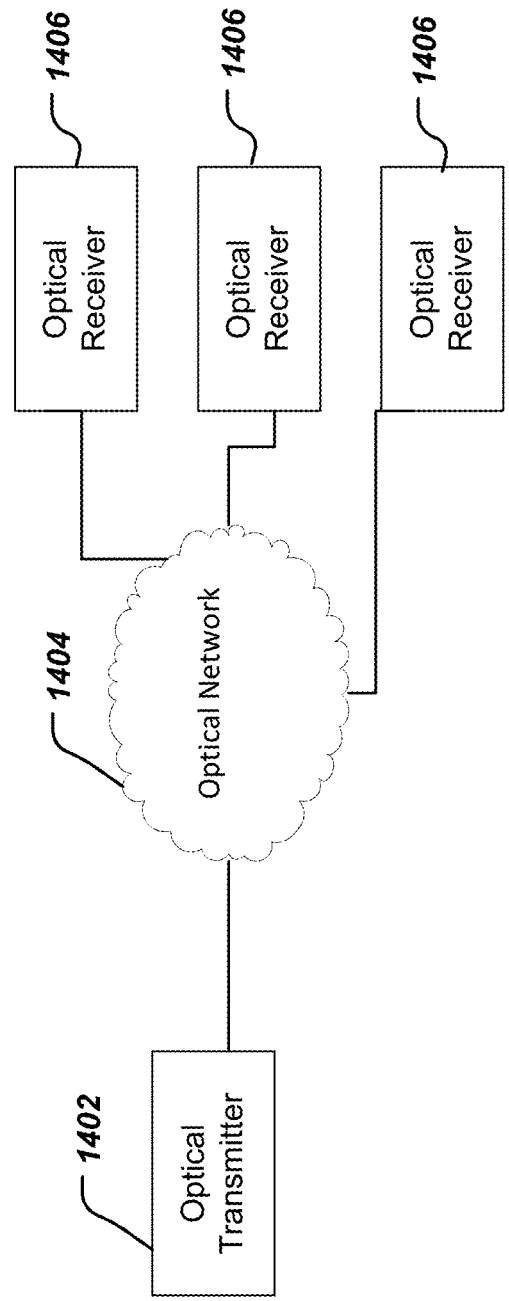
FIG. 14 shows an example embodiment of an optical communication network.

FIG. 14 shows an example embodiment of an optical communication network 1400 in which the presently disclosed technology can be embodied. One or more optical transmitters 1402 are communicatively coupled via an optical network 1404 with one or more optical receivers 1406. The optical network 1404 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 14 for clarity. Furthermore, the over-the-air transmission embodiments described herein are also omitted from the transmission path (typically located within the optical network 1404) of FIG. 14 for clarity.

It will be appreciated that techniques for dual-polarization vector modulated single sideband signal generation, transmission and reception are disclosed. In one aspect, the dual polarization is achieved using a single, integrated modulator, which advantageously allows for high performance, high throughput use of the disclosed technology. It will also be appreciated that the disclosed technology can be advantageously used to generate asymmetric bandwidth signals in which a different carrier can be used for data, thereby allowing adaptation of the technology based on the bandwidth requirement of a communication network.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of optical communication, implemented at a transmitter in an optical communication network, comprising:
operating a first in-phase-quadrature (IQ) modulator for:
receiving a first sequence of information bits;
vector-modulating the first sequence of information bits,
thereby creating a first stream of vector-modulated symbols;
mixing the first stream of vector-modulated symbols with a lower side band (LSB) carrier having a first frequency to generate a complex vector-modulated LSB signal;
generating a first in-phase component signal (I-component signal) by adding an imaginary part of the vector-modulated LSB signal with an imaginary part of an upper side band (USB) carrier having a second frequency;
generating a first quadrature component signal (Q-component signal) by adding a real part of the vector-modulated LSB signal with a real part of the upper side band (USB) carrier having the second frequency;
operating, simultaneously with the first IQ modulator, a second IQ modulator for: receiving a second sequence of information bits;
vector-modulating the second sequence of information bits,
thereby creating a second stream of vector-modulated symbols;
mixing the second stream of vector-modulated symbols with another lower side band (LSB) carrier having the first frequency to generate another complex vector-modulated LSB signal;
generating a second I-component signal by adding an imaginary part of the another vector-modulated LSB signal with an imaginary part of another upper side band (USB) carrier having the second frequency;
generating a second Q-component signal by adding a real part of the another vector-modulated LSB signal with a real part of the USB carrier having the second frequency;
producing, using an integrated dual-polarization IQ modulator, a dual-polarized, vector-modulated optical signal comprising an upper sideband component and a lower sideband component based on the first I-component signal, the first Q-component signal, the second I-component signal, and the second Q-component signal;
splitting the dual-polarized, vector-modulated optical signal into a first polarization beam component and a second polarization beam component;
upconverting the first polarization beam component to a first target radio frequency signal; and
upconverting the second polarization beam component to a second target radio frequency signal;
propagating the first target radio frequency signal and the second target radio frequency signal to a signal output stage; and
transmitting, from the signal output stage, the first target radio frequency signal and the second target radio frequency signal over a transmission medium.

2. The method of claim 1, wherein the first frequency and the second frequency are unequal, and thereby the dual-polarized, vector-modulated optical signal is an asymmetrical signal.

3. The method of claim 1, wherein the upconverting the first polarization beam component and the upconverting the second polarization beam component includes upconverting the first polarization beam component and the upconverting the second polarization beam component to an electrical frequency that is numerically equal to a sum of the first frequency and the second frequency.

4. The method of claim 1, wherein the upconverting the first polarization beam component or the upconverting the second polarization beam component includes operating a photodiode to produce the first or the second target mm-wave radio frequency signal.

5. The method of claim 1, wherein the creating the first stream of vector-modulated symbols includes lowpass filtering and the creating the second stream of vector-modulated symbols includes lowpass filtering.

6. The method of claim 1, wherein the vector-modulating uses one of a quadrature phase shift keying (QPSK) or a quadrature amplitude modulation (QAM) constellation.

7. The method of claim 6, wherein the QPSK modulation scheme is an 4-QPSK modulation scheme.

8. The method of claim 1, wherein the information bits are transmitted over the transmission medium without precoding the information bits.

9. The method of claim 8, wherein the signal output stage comprises a multi-input, multi-output (MIMO) antenna configuration for over-the-air transmission, and wherein propagating the first polarization beam component and the second polarization beam component comprises feeding the first polarization beam component and the second polarization beam component to the MIMO antenna configuration.

10. A communication signal transmission apparatus, comprising:
a first in-phase-quadrature (IQ) modulator that:
receives a first sequence of information bits;
vector-modulates the first sequence of information bits, thereby creating a first stream of vector-modulated symbols;
mixes the first stream of vector-modulated symbols with a lower side band (LSB) carrier having a first frequency to generate a complex vector-modulated LSB signal;
generates a first in-phase component signal (I-component signal) by adding an imaginary part of the vector-modulated LSB signal with an imaginary part of an upper side band (USB) carrier having a second frequency;
generates a first quadrature component signal (Q-component signal) by adding a real part of the vector-modulated LSB signal with a real part of the upper side band (USB) carrier having the second frequency;
a second IQ modulator that operates simultaneously with the first IQ modulator to:
receive a second sequence of information bits;

vector-modulates the second sequence of information bits, thereby creating a second stream of vector-modulated symbols;

mixes the second stream of vector-modulated symbols with another lower side band (LSB) carrier having the first frequency to generate another complex vector-modulated LSB signal;

generates a second I-component signal by adding an imaginary part of the another vector-modulated LSB signal with an imaginary part of another upper side band (USB) carrier having the second frequency;

generates a second Q-component signal by adding a real part of the another vector-modulated LSB signal with a real part of the USB carrier having the second frequency;

an integrated dual-polarization IQ modulator that produces a dual-polarized, vector-modulated optical signal comprising an upper sideband component and a lower sideband component based on the first I-component signal, the first Q-component signal, the second I-component signal, and the second Q-component signal;

a splitter that splits the dual-polarized, vector-modulated optical signal into a first polarization beam component and a second polarization beam component;

a first photodiode that upconverts the first polarization beam component to a first target mm-wave radio frequency signal; and a second photodiode that upconverts the second polarization beam component to a second target mm-wave radio frequency signal;

a transmission link that causes the first target mm-wave radio frequency signal and the second target mm-wave radio frequency signal to propagate to a signal output stage; and the signal output stage that transmit the first target mm-wave radio frequency signal and the second target mm-wave radio frequency signal over a transmission medium.

11. The apparatus of claim 10, wherein the first frequency and the second frequency are unequal, and thereby the dual-polarized, vector-modulated optical signal is an asymmetrical signal.

12. The apparatus of claim 10, wherein the first photodiode and the second photodiode respectively upconvert the first polarization beam component and the upconverting the second polarization beam component to an electrical frequency that is numerically equal to a sum of the first frequency and the second frequency.

13. The apparatus of claim 10, wherein the creating the first stream of vector-modulated symbols includes lowpass filtering and the creating the second stream of vector-modulated symbols includes lowpass filtering.

14. The apparatus of claim 10, wherein the vector-modulating uses one of a quadrature phase shift keying (QPSK) or a quadrature amplitude modulation (QAM) constellation.

15. The apparatus of claim 14, wherein the QPSK modulation scheme is an 4-QPSK modulation scheme.

16. The apparatus of claim 10, wherein the apparatus transmits the information bits over the transmission medium while refraining from precoding the information bits.

17. The apparatus of claim 10, wherein the signal output stage comprises a multi-input, multi-output antenna configuration for over-the-air transmission.

* * * * *